United States Patent
Fukuda

(10) Patent No.: US 11,017,622 B2
(45) Date of Patent: *May 25, 2021

(54) COMMUNICATIONS SYSTEM AND COMMUNICATIONS APPARATUS

(71) Applicant: Sony Corporation, Tokyo (JP)

(72) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,339

(22) Filed: Oct. 24, 2019

(65) Prior Publication Data

US 2020/0074774 A1 Mar. 5, 2020

Related U.S. Application Data

(63) Continuation of application No. 15/783,763, filed on Oct. 13, 2017, now Pat. No. 10,497,194, which is a (Continued)

(30) Foreign Application Priority Data

May 23, 2007 (JP) .................. 2007-136282

(51) Int. Cl.
*G07C 9/28* (2020.01)
*G06K 19/07* (2006.01)
(Continued)

(52) U.S. Cl.
CPC ............. *G07C 9/28* (2020.01); *G06K 7/0008* (2013.01); *G06K 7/10198* (2013.01);
(Continued)

(58) Field of Classification Search
CPC .... G07C 9/28; G06K 7/0008; G06K 7/10198; G06K 19/0723; H04B 17/318; H04B 5/0056; H04B 5/0062; G06Q 20/32
See application file for complete search history.

(56) References Cited

U.S. PATENT DOCUMENTS 5,307,349 A    4/1994 Shloss et al.
5,485,520 A *  1/1996 Chaum ............... G06K 7/0008
                                                 705/74
(Continued)

FOREIGN PATENT DOCUMENTS

JP    01-182782    7/1989
JP    2005-064822  3/2005
(Continued)

OTHER PUBLICATIONS

Japanese Office Action dated Apr. 21, 2009 corresponding to Japanese Appln. No. 2007-136282.

*Primary Examiner* — Mohamed Barakat
(74) *Attorney, Agent, or Firm* — K&L Gates LLP

(57) ABSTRACT

A communications system configured to execute data transmission between a transponder having no radio wave generating source thereof and a reader/writer is provided. The communications system includes, a service permission level notifier configured to tell a service permission level for associated with a received signal level for permitting service acceptance from the reader/writer to the transponder, and an access controller configured to determine in the transponder whether the received signal level from the reader/writer is at the notified service permission level to determine accessibility to the transponder from the reader/writer.

19 Claims, 7 Drawing Sheets

Related U.S. Application Data continuation of application No. 14/071,165, filed on Nov. 4, 2013, now Pat. No. 9,792,743, which is a continuation of application No. 12/112,804, filed on Apr. 30, 2008, now Pat. No. 8,598,985.

(51) Int. Cl.
  *G06K 7/00* (2006.01)
  *G06K 7/10* (2006.01)
  *H04B 5/00* (2006.01)
  *H04B 17/318* (2015.01)
  *G06Q 20/32* (2012.01)

(52) U.S. Cl.
  CPC ......... *G06K 19/0723* (2013.01); *G06Q 20/32* (2013.01); *H04B 5/0056* (2013.01); *H04B 5/0062* (2013.01); *H04B 17/318* (2015.01)

(56) References Cited

U.S. PATENT DOCUMENTS

| | | | |
|---|---|---|---|
| 5,621,412 A * | 4/1997 | Sharpe | G01S 13/74 340/10.33 |
| 5,675,342 A | 10/1997 | Sharpe | |
| 5,778,309 A | 7/1998 | Tuttle et al. | |
| 5,940,006 A | 8/1999 | MacLellan et al. | |
| 6,172,596 B1 | 1/2001 | Cesar et al. | |
| 6,243,012 B1 | 6/2001 | Shober et al. | |
| 6,570,486 B1 | 5/2003 | Simon et al. | |
| 6,903,656 B1 | 6/2005 | Lee | |
| 7,079,034 B2 | 7/2006 | Stilp | |
| 7,154,449 B2 | 12/2006 | Liu et al. | |
| 2004/0203478 A1 | 10/2004 | Scott | |
| 2005/0059379 A1 | 3/2005 | Sovio et al. | |
| 2006/0049946 A1 * | 3/2006 | Sullivan | G06K 7/0095 340/572.2 |
| 2006/0141985 A1 * | 6/2006 | Patel | H04M 3/38 455/410 |
| 2006/0145851 A1 | 7/2006 | Posamentier | |
| 2006/0238302 A1 | 10/2006 | Loving et al. | |
| 2006/0276160 A1 | 12/2006 | Romano et al. | |
| 2007/0115125 A1 | 5/2007 | Lyon et al. | |
| 2007/0135138 A1 | 6/2007 | Brown et al. | |
| 2007/0178935 A1 | 8/2007 | Shim et al. | |
| 2007/0200672 A1 * | 8/2007 | McBride | B60R 25/245 340/5.72 |
| 2007/0222610 A1 | 9/2007 | Tagato | |
| 2007/0229278 A1 | 10/2007 | Nagata et al. | |
| 2008/0065877 A1 * | 3/2008 | Son | H04L 69/32 713/151 |
| 2008/0157929 A1 | 7/2008 | Hilgers et al. | |
| 2008/0238630 A1 | 10/2008 | Chen et al. | |

FOREIGN PATENT DOCUMENTS

| | | |
|---|---|---|
| JP | 2006-216011 | 8/2006 |
| JP | 2006-270365 | 10/2006 |
| JP | 2007-257267 | 10/2007 |
| WO | 2005/124669 | 12/2005 |

* cited by examiner

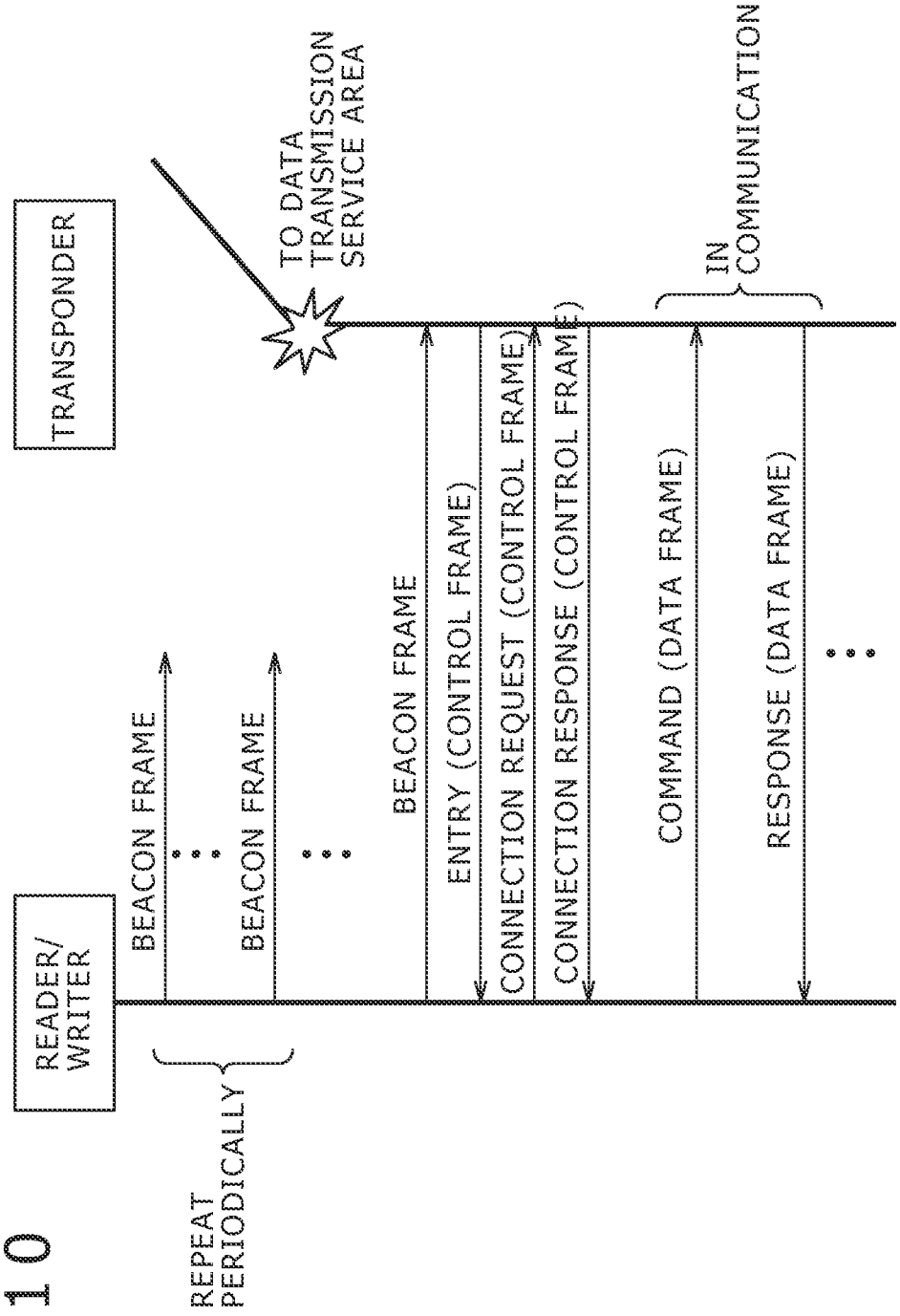

COMMUNICATIONS SYSTEM AND COMMUNICATIONS APPARATUS

CROSS REFERENCES TO RELATED APPLICATIONS

The present application is a continuation of U.S. application Ser. No. 15/783,763, filed Oct. 13, 2017, which is a continuation of U.S. application Ser. No. 14/071,165, filed Nov. 4, 2013, which is a continuation of U.S. application Ser. No. 12/112,804, filed Apr. 30, 2008, which claims priority to Japanese Patent Application JP 2007-136282 filed in the Japanese Patent Office on May 23, 2007, the entire content of each of which is hereby incorporated by reference herein.

BACKGROUND

The present disclosure relates to a communications system of noncontact type in which a communications terminal (or a transponder) containing no radio generating source transmits data with a device (or a reader/writer) that is a communications mate in a wireless manner and to a communications apparatus that is configured to operate as a transponder or a reader/writer in the communications system. More particularly, the present disclosure relates to a communications system and a communications apparatus that are configured to execute data communication on the basis of reflected-wave transmitting by use of the transmission of a non-modulated carrier from a reflected-wave reader and the absorption and reflection of received radio waves based on a terminal operation at an antenna of a reflector.

In detail, the present disclosure relates to a communications system and a communications apparatus that are configured to execute data communication between a transponder and a reader/writer that are arranged at an optimum communications distance and, more particularly, to a communications system and a communications apparatus that are configured to execute communication at an optimum communications distance for every application between the transponder and the reader/writer and, at the same time, prevent the interception by nearby communications terminals so as to ensure the security of transmission data.

A noncontact communications system called RFID (Radio Frequency Identification) is known as a communications system that is configured to transmit data by radio without having an own radio generating source. The RFID is also referred to as an ID system and a data carrier system. Commonly used worldwide is an RFID system or simply RFID, a recognition system based on high frequency (radio). The RFID system is made up of a transponder called a tag and a reader/writer for accessing the transponder. The transponder passively operates on the radio supplied from the reader/writer as an energy source and the reader/writer reads information from the transponder and writes information thereto.

The noncontact communications methods based on the RFID include electrostatic coupling, electromagnetic induction, and radio communicating, for example. With the RFID system based on radio communicating, the transponder has a reflector configured to transmit data by a reflected wave obtained by modulating a non-modulated carrier and the reader/writer has a reflected-wave reader configured to read data from a modulation reflected-wave signal received from the reflector, thereby executing reflected-wave transmission also called backscatter. Receiving a non-modulated carrier from the reflected-wave reader, the reflector modulates the reflected wave on the basis of antenna load impedance switching for example, thereby superimposing data onto the carrier. Namely, because the reflector requires no carrier generating source, a data transmission operation can be driven at low power dissipation. The reflected-wave reader receives the modulated reflected wave thus obtained and demodulates and decodes the received wave to obtain transmission data.

Basically, the reflector has an antenna for reflecting radio that is an incident continuous wave, transmission data generating circuit, and an impedance variation circuit for varying a load impedance of the antenna in correspondence with transmission data (Disclosed in Japanese Patent Laid-open No. Hei 1-182782). The impedance variation circuit is an antenna switch for switching between open and ground of the terminal of the antenna, for example. This antenna switch may be made up of a CMOS (Complementary Metal Oxide Semiconductor) transistor by building the antenna switch into a circuit module. It is also practicable to configure the antenna switch by a GaAs (Gallium Arsenide) IC (Integrated Circuit), separate from the circuit module, thereby realizing high-speed switching at low power dissipation. In the latter, a data transmission rate based on reflected-wave modulation is enhanced, while the power dissipation is suppressed below several 10 μW. Therefore, considering a power dissipation of about sever hundred mW to several W in a wireless LAN (Local Area Network), the reflected-wave communication can be said to be remarkably higher in performance than the average power dissipation of a general LAN (Disclosed in Japanese Patent Laid-open No. 2005-64822).

Because the transponder carrying a reflector only executes an operation of reflecting received radio, the transponder is not regarded as a radio station, so that this transponder can be advantageously handled as outside the regulations imposed on radio communication. While conventional noncontact communications systems use frequencies of several MHz to several hundred MHz (13.56 MHz for example), the reflected-wave transmitting can use a high-frequency band of 2.4 GHz (microwave) called ISM (Industry Science and Medical Band), for example, thereby realizing high-speed data transmission.

In one typical exemplary use of a noncontact communications system, a host device incorporating a transponder, such as a reflector, is arranged on the reading surface of a reader/writer, such as a reflected-wave reader as shown in FIG. 8, thereby executing information reading and writing on the transponder.

The transponder can obtain an electrical power by rectifying a carrier transmitted from the reader/writer; but this power is not enough for the transmission of large amounts of data at high frequencies. Namely, with the transponder, an electrical power for generating a carrier at the time of transmission is not required, while an electrical power necessary for a transmitting operation for modulating a reflected wave and a receiving operation for demodulating and decoding a modulated signal from the reader/writer is supplied from the host device.

For example, if the transponder is built in portable information terminals, such as a digital camera and a mobile phone with camera and a mobile terminal device, such as a portable music player, which are minimized in power dissipation and the reader/writer is built in information equipment based on stationary household appliances, such as a television set, a display monitor, a printer, a personal computer (PC), and a VTR (Video Tape Recorder), a DVD (Digital Versatile Disc) player, then bringing the transponder and the reader/write to proximity of each other allows uploading of image data taken by a mobile phone with camera or a digital camera to the PC in a noncontact manner, thereby storing, displaying, or printing the uploaded image data.

A memory card having capabilities of transponder, such as a reflector, is proposed (disclosed in Japanese Patent Laid-open No. 2006-216011). Such a host device loaded with such a memory card as a digital camera or a mobile phone can access the loaded memory card via a wired interface. On the other hand, an external device, such as a PC or a printer, can read data from a loaded memory card via a reflected-wave transmission route independently of the host device loaded with the memory card. Namely, a noncontact communications operation can be controlled out of control of the host device loaded with a memory card, so that host device need not install any driver software necessary for controlling noncontact communication since the memory card connects to an external device.

Data transmission between transponder and reader/writer requires to establish connection therebetween. For one of communications establishing procedures, a service entry sequence is proposed in which the reader/writer transmits a beacon frame at certain time intervals to tell a service area of own station. (For example, see Japanese Patent Application No. 2006-270365 which has been already devolved to the applicant of the present disclosure)

FIG. 9 shows a communications control sequence for executing reflected-wave transmission between transponder and reader/writer by use of the above-mentioned service entry sequence.

The reader/writer periodically transmits a beacon frame to tell the service area of own station. Also, in an entry period to be provided after the transmission of a beacon frame, the reader/writer continues to transmit a non-modulated carrier for operating the transponder.

On the other hand, the transponder receives a beacon frame to know the existence of the reader/writer and uses the non-modulated carrier received within the entry period to return an entry frame in response to the received beacon frame.

FIG. 10 shows a sequence in which a communications operation is started between reader/writer and transponder by use of the service entry sequence shown in FIG. 9.

The reader/writer executes the transmission of beacon frames at certain time intervals in an intermittent manner. The transponder cannot receive beacon frames outside a radio reach range. However, when the transponder achieves in the radio reach range and a beacon frame comes, the transponder executes the processing of receiving the beacon frame.

On the basis of the information written to the payload of the received beacon frame, the transponder obtains information about communications frequency channels to be used and information such as the ID unique to the reader/writer. In order to establish connection with the reader/writer, the transponder returns an entry frame composed of modulated reflected-wave signal in an entry period by use of a non-modulated carrier transmitted from the reader/writer described above.

On the basis of the written contents of the entry frame transmitted from the transponder, the reader/writer obtains the information such as the ID unique to the transponder and communications parameters that can be set. In order to make communication with the transponder, the reader/writer transmits a connection request frame with specified information such as communications parameters written to the payload. In response to this connection request, the transponder returns a connection response frame with the information such as a connection result written to the payload, upon which the connection between transponder and reader/writer is established. While the connection is established, information is read from the transponder and written thereto by repeating the transmission of command frames from the reader/writer and the return of response frames by the transponder.

The reader/writer need not always continue to transmit beacon frames at certain time intervals. For example, the reader/writer can establish connection through the same connection request/response sequence as described above after the transmission of a beacon frame (or an irregular transmission request signal) when to read information from the transponder (to be more specific, every time an application for reading/writing data with the transponder is started up). Namely, the reader/writer can suppress the transmission of unnecessary beacon frames and the transmission of the non-modulated carrier during an entry period.

In the communications sequence shown in FIG. 10, a handshake is executed between the reader/writer and the transponder by use of a beacon frame and entry frame and then the reader/writer transmits a connection request frame, in response to which the transponder returns a connection response frame. Conversely, it is also practicable for the transponder to transmit a connection request frame, in response to which the reader/writer returns a connection response frame.

Today, a noncontact communications system, such as described above, executes an information read/write operation in a noncontact manner between the transponder and the reader/writer, thereby enhancing the convenience of use to expand the application of this system to the conventional magnetic cards, such as commuter passes and certification cards, and distribution systems.

Unlike wired communication, wireless communication is much more vulnerable to the risk of the interception of information that is carried by wireless communications systems, so that the communication routes must be encrypted. For example, if the non-contact communications system is used for the reading/writing of value information, such as the settlement in electronic money, or room access control, the ability of communication with terminals located in the proximity of the transponder and the reader/writer presents a serious problem in security.

For example, with wireless LAN systems, such as the IEEE 802.11 system, a scheme is introduced in which encryption keys, such as WEP (Wired Equivalent Privacy) and PSK (Pre-Shared Key) are held in common in the BSS (Basic Service Set) managed by a control station, thereby enabling the terminal stations accommodated in a network to have secure communications paths based on encryption. However, the installation of such a scheme on noncontact communication systems that are characterized by low-cost configuration is not realistic.

With noncontact communications systems based on electromagnetic induction, the induction field decreases in inverse proportion to the cube of distance, so that the risk of interception by nearby communications terminals is comparatively low. However, with applications in which the transponder is installed on a device providing an information source, such as a digital camera, a mobile phone with camera, or a portable music player, to transmit information content to the reader/writer of a display apparatus or an audio output apparatus for outputting image or sound, it is inconvenient to have the communications distance limited to proximity.

The noncontact communication based on reflected-wave transmitting uses radio waves that attenuate in reverse proportion to distance, so that the communications distance is comparatively long for enhanced user-friendliness, but at the cost of sufficient security measures for the transmission of value information.

SUMMARY

Therefore, the embodiments of the present disclosure address the above-identified and other problems associated with related-art methods and apparatuses and solves the addressed problems by providing a communications system capable of suitably executing noncontact data transmission between a transponder having no radio wave generating source of its own and a reader/writer and a communications apparatus capable of suitably operating as a transponder or a reader/writer in the above-mentioned communications system.

Another embodiment provides a communications system capable of noncontact data transmission based on reflected-wave transmitting and a communications apparatus capable of suitably operating as a transponder or a reader/writer in the above-mentioned communications system.

Still another embodiment provides a communications system and a communications apparatus that are configured to suitably execute data communication between a transponder and a reader/writer arranged at an optimum distance.

Yet another embodiment provides a communications system and a communications apparatus that are configured to execute communication at an optimum distance between a transponder and a reader/writer for every application and, at the same time, keep the security of transmission data by preventing the interception by nearby communications terminals.

In carrying one embodiment thereof, there is provided a communications system configured to execute data transmission between a transponder having no radio wave generating source thereof and a reader/writer. The above-mentioned communications system has a service permission level notifier configured to tell a service permission level for associated with a received signal level for permitting service acceptance from the reader/writer to the transponder; and an access controller configured to determine in the transponder whether the received signal level from the reader/writer is at the notified service permission level to determine accessibility to the transponder from the reader/writer.

It should be noted that term "system" as used herein denotes a logical set of a plurality of component units and these component units are not necessary accommodated in a same housing.

Because a noncontact communications system executes an information read/write operation in a noncontact manner between the transponder and the reader/writer, thereby enhancing the convenience of use to expand the application of this system to the conventional magnetic cards, such as commuter passes and certification cards, and distribution systems.

For example, compared with electromagnetic induction and the like, noncontact communications systems based on reflected-wave modulating using electric wave communication can increase the communications distance for realizing high-speed data transmission using a high frequency band of 2.4 GHz for example, thereby enhancing user friendliness.

However, unlike wired communication, wireless communication is much more vulnerable to the risk of the interception of information that is carried by wireless communications systems, so that applications for reading/writing value information such as the settlement by electronic money and room access control must be secured. On the other hand, if the communications distance is limited to proximity, user friendliness is deteriorated in such applications as entertainment in which images taken by a digital camera are displayed on the television set, for example.

In contrast, the communications system according to an embodiment is made up of a transponder and a reader/writer by applying noncontact communication such as reflected-wave transmission, for example, in which the reader/writer side controls the area communicable with the transponder for each application. Therefore, user friendliness can be enhanced by limiting the communicable area with those applications which require security such as the transmission of value information, while enlarging the communicable area for entertainment applications.

The communications system according to an embodiment uses a service entry sequence (refer to FIGS. 9 and 10) in which the reader/writer notifies the transponder of a beacon frame at a predetermined time interval and the transponder returns a response frame in response to the beacon frame by use of a predetermined entry period provided after transmission of the beacon frame, for example.

The reader/writer sets a service permission level in accordance with an application for providing a service to the transponder and notifies the transponder of the set service permission level by means of a beacon frame. In response, the transponder determines whether a received signal level of the beacon frame (or another received frame) received from the reader/writer is at the service permission level given by the reader/writer, thereby determining the accessibility to the transponder from the reader/writer.

Consequently, by setting a service permission level according to an application for providing service to the transponder, the reader/writer can control the area communicable with the transponder in accordance with each application for providing a service to the transponder.

For example, if the reader/writer has started up an application for executing data communication of high security, the reader/writer sets a high service permission level to transmit a beacon frame. If the beacon received signal level is high, or the reader/writer is in the proximity, the transponder permits access from the reader/writer, thereby preventing interception by nearby communications terminals.

On the other hand, if the reader/writer has started up an application for executing data communication, such as image or audio data requiring low security, there is little need for caring about interception. Therefore, the reader/writer sets a low service permission level to transmit a beacon frame and, in response, the transponder permits access by the reader/writer when the beacon received signal level is low, or the communication distance with the reader/writer is comparatively long, so that the user need not bring the reader/writer and the transponder closest to each other, thereby enhancing the ease of use.

As described and according to an embodiment, an excellent communications system capable of suitably executing noncontact data transmission based on reflected-wave transmission between a transponder having no radio wave generating source of its own and a reader/writer and an excellent communications apparatus capable of suitably operating as the transponder or the reader/writer in this communications system are provided.

In addition, an embodiment provides an excellent communications system and an excellent communications apparatus that are capable of executing communication at a distance that is optimum for each application between the transponder and the reader/writer and, at the same time, keeping the security of transmitted data by preventing the interception by nearby communications terminals.

With the communications system according to an embodiment, the read/writer side controls the area communicable with the transponder for each application. For example, the embodiment is applicable to a communications system using "service entry sequence" (refer to FIGS. 9 and 10) in which the reader/writer transmits a beacon frame to tell a service area of its own and the transponder return an entry frame within a predetermined entry period. Having started up an application for reading/writing data with the transponder, the reader/writer sets a service permission level according to the application (or a type thereof) and writes the set service permission level to the beacon frame. Having received this beacon frame, the transponder interprets the contents of the received beacon frame and determines whether the received signal level of this beacon frame is at the service permission level to determine the accessibility to the transponder from the reader/writer. Therefore, user friendliness can be enhanced by limiting the communicable area with those applications which require security such as the transmission of value information, while enlarging the communicable area for entertainment applications.

Additional features and advantages are described herein, and will be apparent from the following Detailed Description and the figures.

BRIEF DESCRIPTION OF THE FIGURES

FIG. 10 is a sequence chart indicative of a sequence to be executed when starting a communications operation by use of the service entry sequence shown in FIG. 9 between a reader/writer and a transponder.

DETAILED DESCRIPTION

Figure 1:
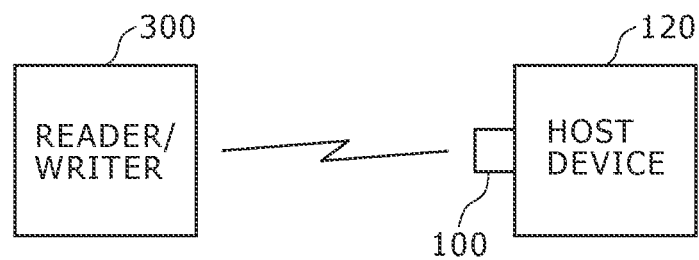
FIG. 1 is a schematic diagram illustrating an exemplary configuration of a communications system practiced as one embodiment.

Referring to FIG. 1, there is schematically shown a communications system according to one embodiment. The communications system shown is made up of a memory card 100 incorporating a transponder, not shown, a host device 120 with this memory card 100 loaded in a dedicated slot thereof, and a reader/writer 300 configured to execute non-contact data transmission with the transponder. The host device 120 may be a mobile device configured to accommodate the memory card 100, such as a digital camera or a mobile phone with camera. The transponder passively operates on a radio wave energy supplied from the reader/writer 300. The reader/writer 300 reads information stored in the transponder and writes information thereto.

Noncontact communications methods include electrostatic coupling, electromagnetic induction, and radio communicating, for example. In what follows, the application of radio communicating is assumed, thereby executing reflected-wave transmission called backscatter. The reflected-wave communicating is characterized by a low power dissipation in a communications form in which the transmission from the reflector side occupies most of communication.

The transponder has a reflector configured to transmit data by a reflected wave obtained by modulating a non-modulated carrier. The reader/writer 300 has a reflected-wave reader configured to read the data out of a modulated reflected-wave signal supplied from the reflector. Receiving a non-modulated carrier from the reflected-wave reader, the reflector modulates the received reflected wave by switching between antenna load impedances for example, thereby superimposing data on the non-modulated carrier. The reflected-wave reader receives this modulated reflected wave to demodulate and decode the received modulated reflected wave, thereby obtaining transmission data.

Configuring an antenna load impedance switch with a GaAs IC allows a high-speed switching operation with low power dissipation, which is smaller than about several 10 µW. This configuration can also realize high-speed data transmission in a high frequency band of 2.4 GHz (micro wave).

Although the transponder can obtain electrical power by rectifying a carrier transmitted by the reader/writer 300, the electrical power thus obtained is insufficient for the transmission of large amounts of data at high speeds. Namely, the transponder need not the electrical power for generating a carrier at the time of transmission. However, an electrical power necessary for executing a transmitting operation for modulating a reflected wave and a receiving operation for demodulating and decoding a modulated signal from the reader/writer 300 is supplied from the host device 120.

Figure 2:
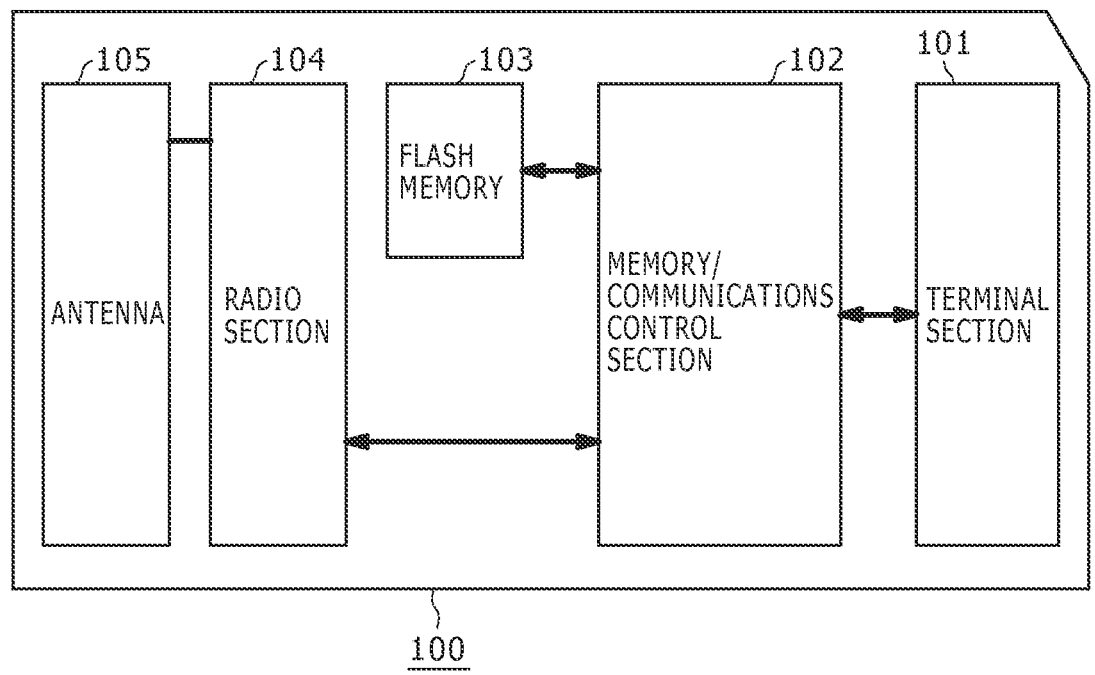
FIG. 2 is a block diagram illustrating an exemplary internal configuration of a memory card in which a transponder is incorporated.

FIG. 2 shows an exemplary internal configuration of the memory card 100 in which a transponder is built. The memory card 100 shown has a flash memory 103 making up a storage block, a terminal section 101, a memory/communications control section 102, a radio section 104, and an antenna 105.

A contact portion of the terminal section 101 is exposed outside, being connectible with the host device 120 as with an ordinary memory card. The flash memory 103 is able to store data in an electrically rewritable manner. The memory/ communications control section 102 transfers data between the host device 120 and the flash memory 103 via the terminal section 101 and transmits data of the memory/communications control section 102 to the reader/writer 300 via the radio section 104 and the antenna 105 in the form of reflected waves. The radio section 104 is equivalent to a transponder in a noncontact communications system.

Figure 3:
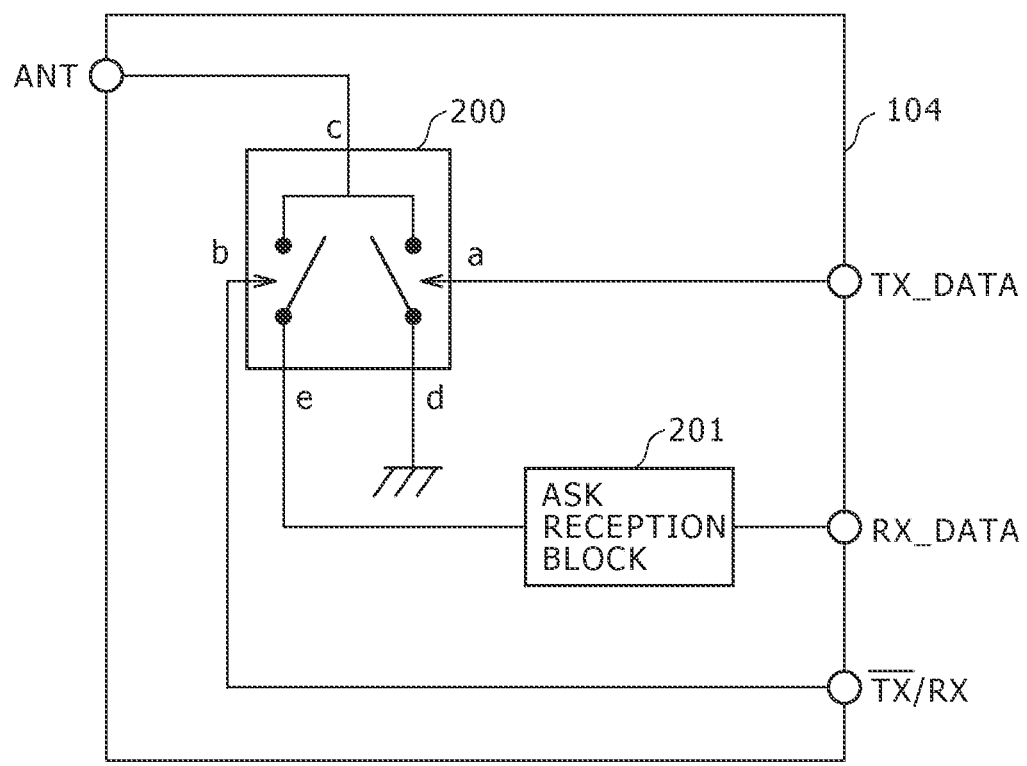
FIG. 3 is a circuit diagram illustrating an exemplary internal configuration of a radio section in the memory card shown in FIG. 2.

FIG. 3 shows an exemplary internal configuration of the radio section 104 in the memory card 100 shown in FIG. 2. The radio section 104 shown, equivalent to a transponder in a noncontact system, can operate here as a reflector in reflected-wave transmission.

Reference numeral 200 denotes an antenna switch of an SPDT (Single Pole/Double Throw) switch, which also switches between reflected-wave generation and transmission/reception. In the figure, terminal c is connected to the antenna 105 in the memory card 100. The antenna switch 200 is configured by a GaAs IC, for example, separate from another CMOS circuit module.

When transmission is made from the radio section 104, terminal b is turned off by a control signal (TX/RX) from a baseband control section (not shown). Next, transmission data (TX_DATA) is applied to terminal a from the baseband control section. As shown in the figure, because terminal d of the antenna switch 200 is grounded, if the transmission data is "1", the terminal of the antenna 105 is short-circuited. If the transmission data is "0", the terminal of the antenna 105 is opened. Thus, on the basis of a bit image of transmission data, the switching of the antenna switch 200 (namely, the switching of the terminal of the antenna 105) phase-modulates a non-modulated carrier received from the antenna 105, the phase-modulated carrier being radiated from the antenna 105 as a modulated reflected-wave signal.

On the other hand, at the time of reception by the radio section 104, terminal b is kept on by the baseband control section, not shown. Therefore, an ASK (Amplitude Shift Keying) modulated signal received at the antenna 105 is transmitted to an ASK reception block 201 via terminal e to be demodulated into reception data (RX_DATA). Thus, the reception data is passed to the baseband control section, not shown.

Figure 4:
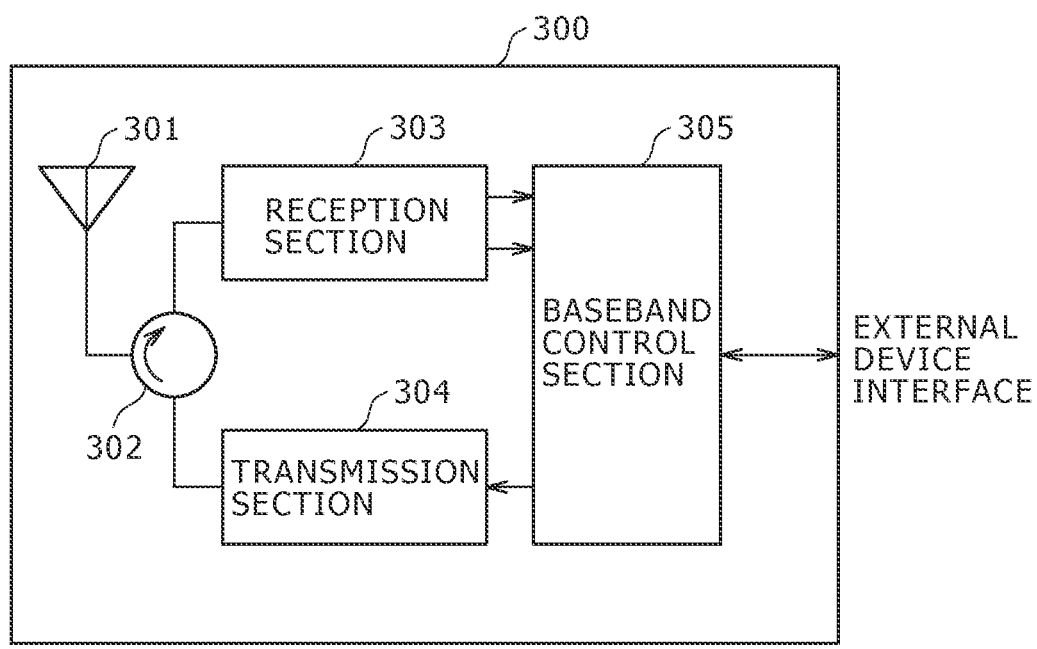
FIG. 4 is a block diagram schematically illustrating an exemplary internal configuration of a reader/writer that functions as a reflected-wave reader with which the radio section shown in FIG. 3 communicates.

FIG. 4 schematically shows an exemplary internal configuration of the reader/writer 300 as a reflected-wave reader with which the radio section 104 shown in FIG. 3 makes communication. The reader/writer 300 shown has an antenna 301, a circulator 302, a reception section 303, a transmission section 304, and a baseband control section 305.

The transmission section 304 generates a non-modulated carrier as instructed by the baseband control section 305. The non-modulated carrier is radiated toward the radio section 104 from the antenna 301 via the circulator 302. The circulator 302 is used to separate the transmission wave from the reception wave when transmission and reception are executed at the same time.

As described above, the radio section 104 generates a reflected wave for the non-modulated carrier from the reader/writer 300, the reflected wave being phase modulated in accordance with read data, so that the reflected wave is returned to the reader/writer 300 as a modulated reflected wave. Being received by the reception section 303 via the antenna 301 and the circulator 302, this modulated reflected wave is converted into a baseband IQ signal made up of in-phase (I) and quadrature (Q) thereof to be demodulated in the baseband control section 305.

In transmitting data and a control command from the reader/writer 300 to the radio section 104, the transmission section 304 generates an ASK modulated wave in accordance with transmission data from the baseband control section 305, the generated ASK modulated wave being radiated from the antenna 301.

The baseband control section 305 has an interface for other devices. This interface can decode read image data and supply the decoded image data to a television set, not shown, as a video signal to be displayed or to a PC, not shown, connected via USB (Universal Serial Bus).

Figure 9:
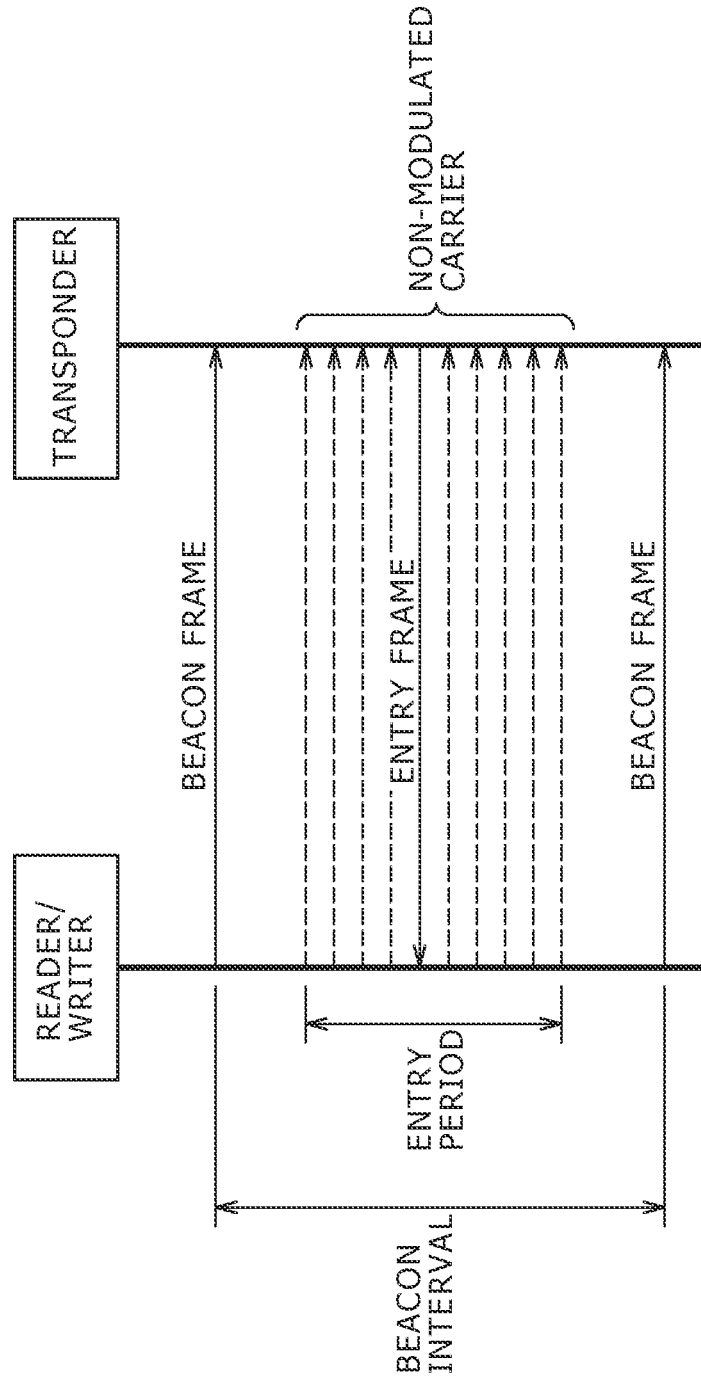
FIG. 9 is a sequence chart indicative of a communications control sequence for executing reflected-wave transmission between a transponder and a reader/writer by use of a service entry sequence.

In the present embodiment, it is assumed that the service entry sequence shown in FIGS. 9 and 10 be applied to the communications control between the transponder and the reader/writer 300. Namely, the reader/writer 300 transmits a beacon frame to tell a service area of the reader/writer 300 and the transponder returns an entry frame within a predetermined entry period in response, upon which the connection between the reader/writer 300 and the transponder is established via a connection request and a connection response sequence.

It is not necessary for the reader/writer 300 to always keep transmitting a beacon frame at a certain time interval. However, when the reading of information from the transponder becomes necessary (to be more specific, every time an application for reading/writing data with the transponder is started up), the reader/writer 300 starts a beacon transmitting operation. For example, the reader/writer 300 transmits a beacon frame every 10 to 100 millisecond.

Also, in the present embodiment, when the reader/writer 300 starts up an application for reading/writing information with the transponder, the reader/writer 300 sets a service permission level suitable for that application (or the type of the application) and writes the service permission level to the beacon frame. In response, having received the beacon frame, the transponder interprets the contents of the received beacon frame and determines the accessibility by the reader/writer depending on whether the received signal level of this beacon frame is at the service permission level.

Here, it is assumed that the reader/writer transmit a beacon frame at a certain transmission power and the transponder receive the beacon frame basically by direct wave (line-of-sight communication), the received signal level at the transponder side being proportional to the communication distance with the reader/writer.

For example, having started up an application for executing data communication of high security, the reader/writer 300 sets a higher service permission level to transmit a beacon frame. In response, if the beacon received signal level is high, or only if the reader/writer 300 is located in the proximity, the transponder permits access by the reader/writer 300, so that the interception by nearby communications terminals can be prevented.

On the other hand, if the reader/writer 300 has started up an application for executing data communication, such as image or audio data requiring low security, there is little need for caring about interception. Therefore, the reader/writer 300 sets a low service permission level to transmit a beacon frame and, in response, the transponder permits access by the reader/writer 300 when the beacon received signal level is low, or the communication distance with the reader/writer 300 is comparatively long, so that the user need not bring the reader/writer 300 and the transponder closest to each other, thereby enhancing the ease of use.

Figure 5:
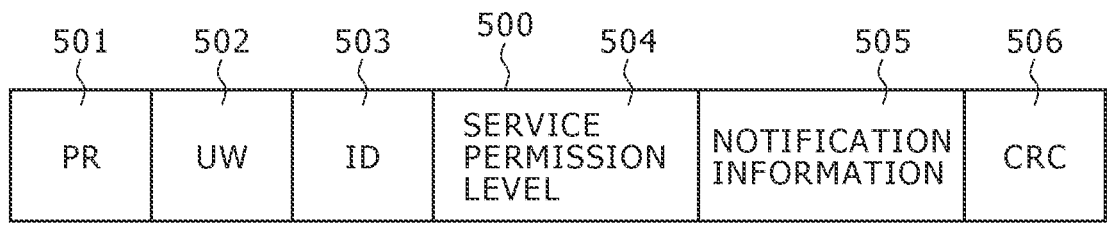
FIG. 5 is a diagram illustrating an exemplary frame format of a beacon signal that is used in the communications system according to an embodiment.

FIG. 5 shows a frame format of a beacon signal that is used in the communications system according to an embodiment.

A beacon frame 500 is made up of elements of information, such as a preamble 501, a unique word 502, an ID 503 of reader, a service permission level 504, notification information 505, and an error verification code (CRC) 506.

The preamble 501 is used for bit (symbol) synchronization to be executed at demodulation. The unique word 502 is indicative of a data start position. The ID 503 is an identifier uniquely assigned to every reader. The notification information 505 stores communication-associated parameters and service information. A beacon period is also stored in the notification information 505. The error verification code (CRC) 506 is a CRC (Cyclic Redundancy Code) parity assigned to the data from the ID 503 to the notification information 505 of every beacon frame.

The service permission level 504 is an information element newly added to the present embodiment in order for the reader/writer 300 to control a communicable area corresponding to every application. The service permission level 504 is indicative how high the reception level of a beacon signal from the reader/writer 300 should be.

For example, assume that 60 [dBµV] be displayed as the service permission level 504. In this case, if a beacon signal is received from the reader/writer 300 at 50 [dBµV], the transponder cannot request the reader/writer 300 for connection. If a beacon signal is received from the reader/writer 300 at 65 [dBµV], the transponder can transmit a connection request signal to the reader/writer 300.

Therefore, having started up an application for executing data communication of high security, the reader/writer 300 sets the service permission level 504 at a high level to transmit a beacon frame. In response, the transponder operates to permit access by the reader/writer 300 only when the reader/writer 300 is in the proximity, thereby preventing the interception by nearby communications terminals.

On the other hand, when the reader/writer 300 has started up an application for executing data communication of image or audio data of low security, there is little necessity for taking the interception into consideration, so that the reader/writer 300 sets the service permission level to a low level to transmit a beacon frame. In this case, if the communications distance is comparatively long, the transponder permits the access by the reader/writer 300, so that the user need not bring the communications devices closest to each other, thereby enhancing the ease of use.

In accordance with the service permission level 504 in the received beacon frame, the transponder controls the access by the reader/writer 300 depending on the received signal strength of the received beacon (or another frame received from the reader/writer 300).

Hence, the radio section 104 in the transponder has means of measuring RSSI (Receiving Signal Strength Indicator). In the basis of a result of RSSI measurement, the memory/communications control section 102 determines whether to transmit a connection request frame to the reader/writer 300 (or whether to return a connection response frame in response to the connection request frame received from the reader/writer 300).

Figure 6:
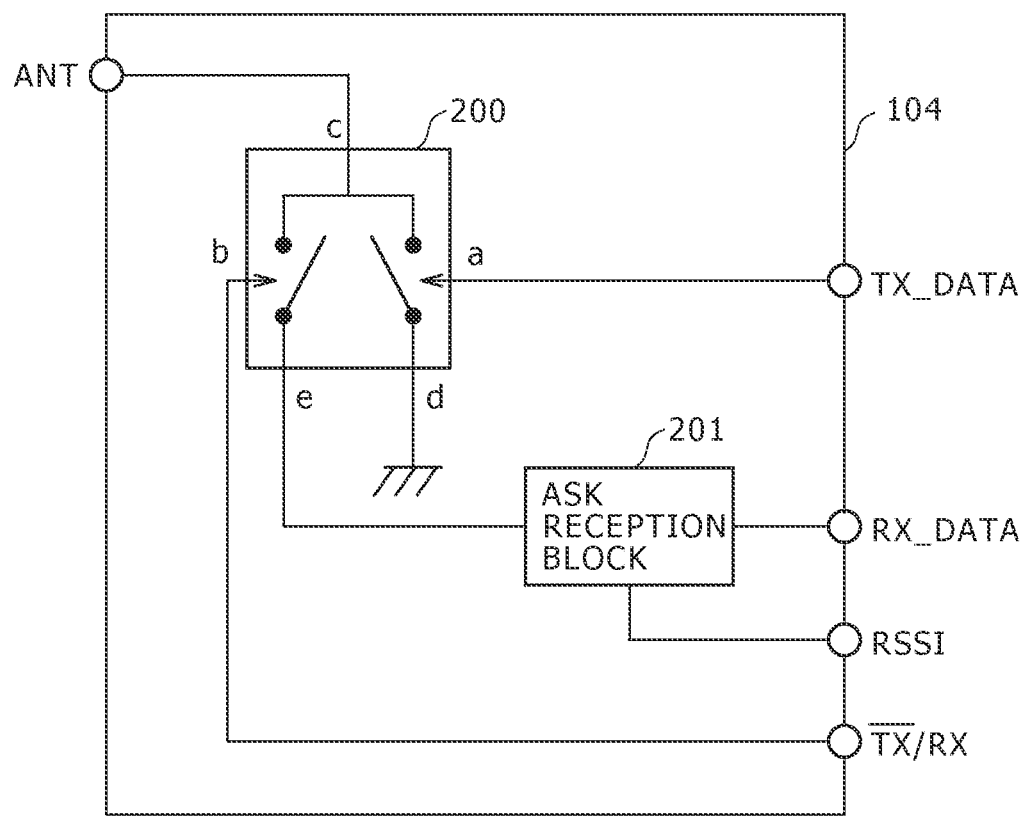
FIG. 6 is a circuit diagram illustrating an exemplary configuration of the radio section having means of transmitting RSSI measurement results to a memory/communications control section.

FIG. 6 shows an exemplary configuration of the radio section 104 having the means of transmitting RSSI measurement results to the memory/communications control section 102. A difference between the configuration shown in FIG. 6 from that shown in FIG. 3 lies in that the ASK reception block 201 is provided with the means of transmitting RSSI to the memory/communications control section 102. The measurement of reception level is easy because ASK reception is executed originally.

Figure 7:
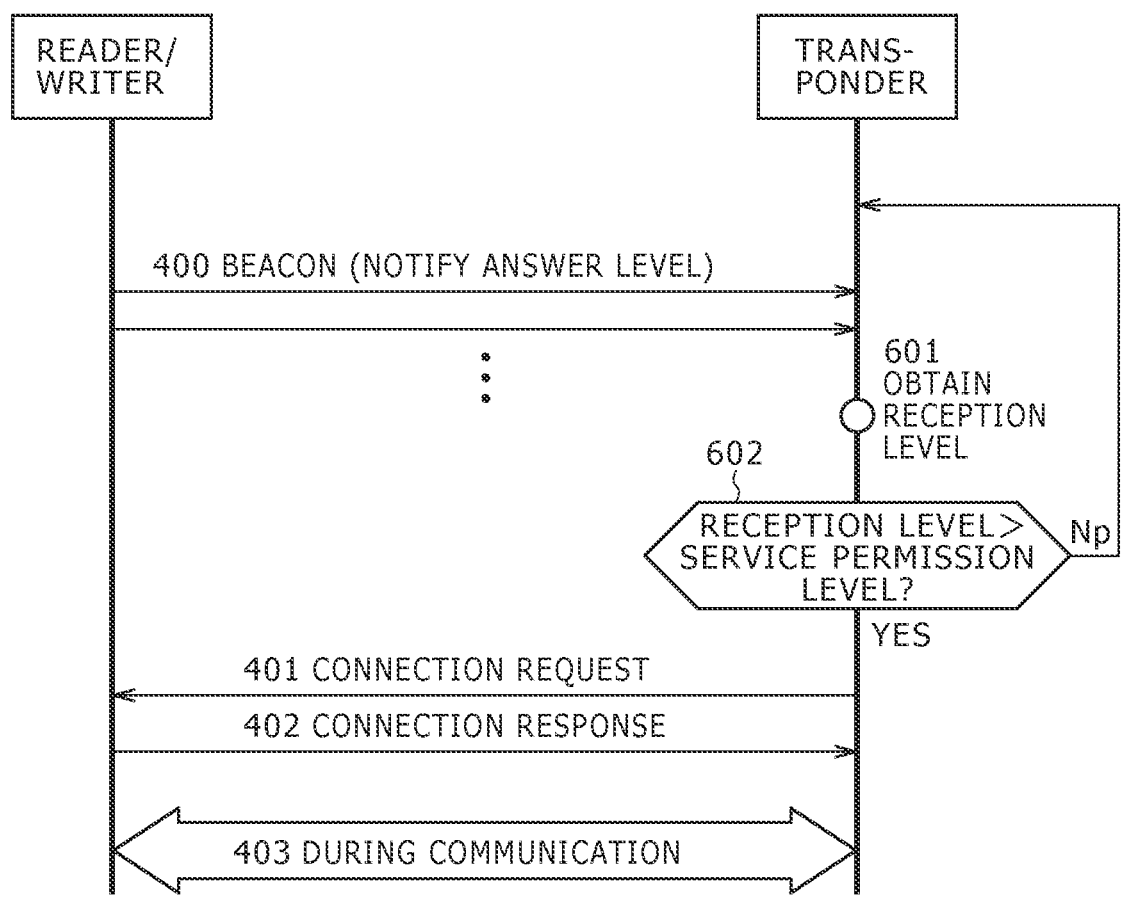
FIG. 7 is a sequence chart indicative of an exemplary communications sequence to be executed between a transponder and a reader/writer in the communications system according to an embodiment.
Figure 8:
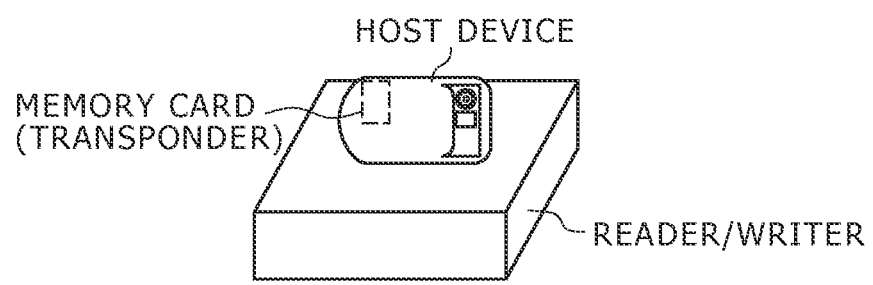
FIG. 8 is a perspective view of a host device incorporating a transponder such as a reflector arranged on a reading surface of a reader/writer such as a reflected-wave reader, thereby executing a reading/writing operation with the transponder.

FIG. 7 shows an exemplary communications sequence that is executed between the transponder and the reader/writer 300 in the communications system according to the embodiment. It should be noted that, although not shown in the figure, the transponder is assumed to return an entry frame in response to a beacon frame transmitted from the reader/writer 300. Also, when the transponder transmits a connection request signal or other signals, it is assumed that a non-modulated carrier be supplied from the reader/writer 300 in advance.

Having received the beacon frame 400, the transponder reads and stores the service permission level 504 contained in the beacon frame 400. Further, the transponder measures the reception level of the beacon frame 400 (601) to determine whether the reception level is higher than the service permission level (602).

If the reception level is found to be higher than the service permission level 504, then the transponder transmits, to the reader/writer 300, the connection request frame 401 as a modulated reflected-wave signal in response to the non-modulated carrier received from the reader/writer 300.

In response, having received the connection request signal 401 from the transponder, the reader/writer 300 returns a connection response frame 402 to the transponder. This establishes connection between the transponder and the reader/writer 300, thereby putting the communications system into the communication state 403.

While embodiments have been described using specific terms, such description is for illustrative purpose only.

In the description hereof made so far, the embodiment applied to communications systems configured to execute reflected-wave transmission has been mainly described. However, the embodiments not limited thereto. For example, even with communications systems employing another communications scheme in which the transponder having no radio wave generating source of its own executes a data transmitting operation, such as electrostatic coupling or electromagnetic induction, the embodiments are applicable in the same manner in a situation where the reader/writer need to control the communicable area with the transponder for every application. Alternatively, the present embodiments are applicable in the same manner to communications systems in which both the transmitting and receiving communications devices have radio wave generating sources of their own.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A first apparatus comprising:
   a communication circuit which is configured to communicate with a second apparatus; and
   a controller which is configured to control the first apparatus to:
   receive, from the second apparatus, information regarding electronic money;
   receive, from the second apparatus, a beacon frame including a security level written in the beacon frame; and
   determine whether the first apparatus is within a service area identified by said security level, which specifies a predefined area around the second apparatus as the service area, wherein the service area has an access range that is determined depending on a service, and a first service has a different service area than a second service.

2. The first apparatus of claim 1, further comprising:
a measuring unit which is configured to measure an RSSI (Receiving Signal Strength Indicator) of the beacon frame.

3. The first apparatus of claim 2, wherein the controller is further configured to estimate an approximate proximity to the second apparatus using the RSSI of the beacon frame measured with the measuring unit.

4. The first apparatus of claim 3, further comprising:
a memory which is configured to store at least one application.

5. The first apparatus of claim 4, wherein the controller is further configured to activate the at least one application when the controller determined that the first apparatus is within the service area.

6. The first apparatus of claim 5, wherein the at least one application is associated with said security level.

7. The first apparatus of claim 4, wherein the controller is further configured to control access to the memory based on said approximate proximity.

8. A method for communicating between a first apparatus and a second apparatus, the method comprising:
receiving, from the second apparatus, information regarding electronic money;
receiving, from the second apparatus, a beacon frame including a security level written in the beacon frame; and
determining whether the first apparatus is within a service area identified by said security level, which specifies a predefined area around the second apparatus as the service area,
wherein the service area has an access range that is determined depending on a service, and a first service has a different service area than a second service.

9. The method of claim 8, wherein the method is further comprising:
measuring an RSSI (Receiving Signal Strength Indicator) of the beacon frame.

10. The method of claim 9, further comprising:
estimating an approximate proximity to the second apparatus using the RSSI of the beacon frame.

11. The method of claim 10, further comprising:
activating an application in response to determining that the first apparatus is within the service area.

12. The method of claim 11, wherein the application is associated with said security level.

13. The method of claim 10, further comprising:
controlling access to a memory based on said approximate proximity.

14. A non-transitory computer readable medium storing instructions for communicating between a first apparatus and a second apparatus which, when executed, cause the first apparatus to:
receive, from the second apparatus, information regarding electronic money;
receive, from the second apparatus, a beacon frame including a security level written in the beacon frame; and
determine whether the first apparatus is within a service area identified by said security level, which specifies a predefined area around the second apparatus as the service area,
wherein the service area has an access range that is determined depending on a service, and a first service has a different service area than a second service.

15. The non-transitory computer readable medium of claim 14, wherein the instructions stored in the medium, when executed, further cause the first apparatus to:
measure an RSSI (Receiving Signal Strength Indicator) of the beacon frame.

16. The non-transitory computer readable medium of claim 15, wherein the instructions stored in the medium, when executed, further cause the first apparatus to:
estimate an approximate proximity to the second apparatus using the RSSI of the beacon frame.

17. The non-transitory computer readable medium of claim 16, wherein the instructions stored in the medium, when executed, further cause the first apparatus to:
activate an application in response to determining that the first apparatus is within the service area.

18. The non-transitory computer readable medium of claim 16, wherein the instructions stored in the medium, when executed, further cause the first apparatus to:
activate an application associated with said security level in response to determining that the first apparatus is within the service area.

19. The non-transitory computer readable medium of claim 16, wherein the instructions stored in the medium, when executed, further cause the first apparatus to:
control access to a memory based on said approximate proximity.

* * * * *